April 25, 1967  P. K. DAVIS  3,315,991
PIPE COUPLING
Filed Nov. 17, 1964

INVENTOR.
PAUL K. DAVIS
BY Boyken, Mohler & Foster
ATTORNEYS

United States Patent Office 3,315,991
Patented Apr. 25, 1967

3,315,991
PIPE COUPLING
Paul K. Davis, Alameda, Calif., assignor to Davis-Miller Corporation, Hayward, Calif., a corporation of California
Filed Nov. 17, 1964, Ser. No. 411,809
4 Claims. (Cl. 285—373)

The present invention relates generally to couplings for pipes and like tubular members, and more particularly to a strap or band form of coupling especially well suited for joining together sections or lengths of corrugated sheet metal pipe.

In running lines of culvert pipe and other conduit it is necessary to couple individual lengths of pipe together to form a continuous run of pipe. For this purpose it is desirable to provide a simply constructed coupling which may be rapidly mounted over the ends of adjacent pipe lengths as the pipe is laid. It is further desirable that the coupling be capable of maintaining proper axial alignment between coupled lengths of pipe and also be capable of sealing such pipe lengths against leakage of material to be conducted therethrough, while allowing for temperature introduced pipe contraction and expansion and irregularities which may exist at the joint interface between adjacent pipe ends. The coupling of the present invention is particularly well adapted to accomplish these functions.

Problems have been encountered in connection with coupling lengths of corrugated sheet metal pipe in that the corrugations thereon make effective sealing difficult to obtain. Coupling is also complicated because even so-called standard sizes of such pipe frequently vary somewhat in diameter and in the dimensions of the corrugations formed thereon.

Sheet metal pipe lengths commonly are available with annular or circumferential corrugations, or helical corrugations having both left and right handle helices. Therefore, further complications are encountered when the lengths of pipe to be coupled have different patterns of corrugations thereon.

It is therefore a main object of this invention to provide an adjustable strap or band type coupling for joining lengths of pipe primarily of the corrugated sheet metal type.

It is another object of this invention to provide a new, simply constructed and easily applied strap or band type coupling which includes means for firmly holding the coupling about the opposed ends of adjacent pipe lengths in straddling relationship to the joint interface defined therebetween.

A further object of this invention is the provision of a coupling which forms a lead proof seal between coupled pipe lengths which have similar or dissimilar patterns of corrugations thereon, or which may differ somewhat in external dimensions.

A further object of this invention is the provision of a coupling which includes means for effectively preventing axial separation of and relative rotative movement between adjacent lengths of pipe coupled thereby.

Yet another object is the provision of a coupling which will accommodate rough or irregularly formed edges at the adjacent opposed ends of the pipe lengths to be coupled and will also allow for expansion and contraction thereof.

Other objects and advantages will become apparent from the following description of one preferred embodiment of the invention taken in connection with the accompanying drawings, in which.

Figure 1:
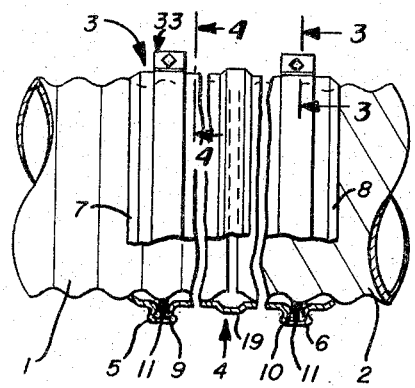
FIG. 1 is an elevational view of a preferred form of the coupling of this invention located in straddling relationship about adjacent ends of two pipe lengths coupled thereby, with a portion of the coupling cut away.
Figure 2:
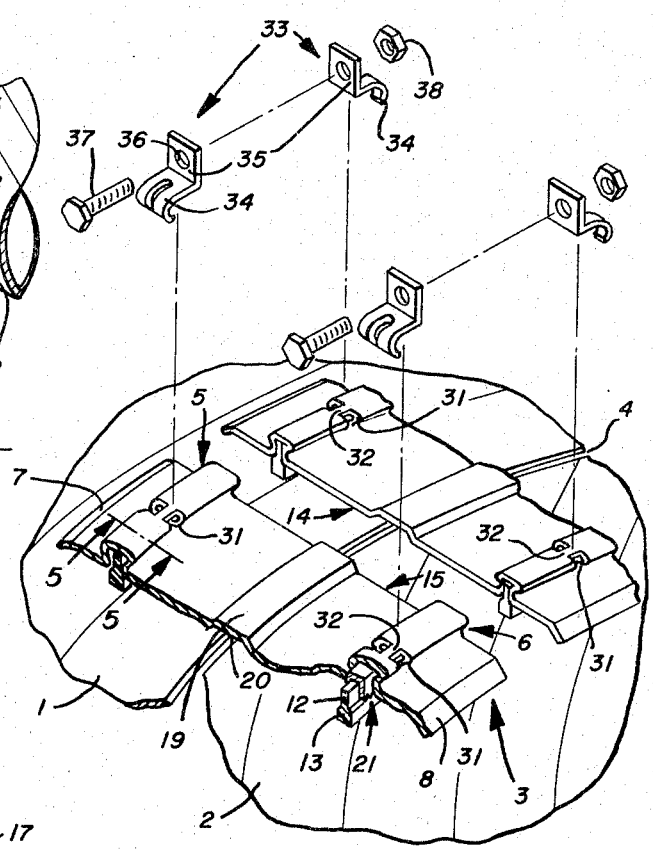
FIG. 2 is an exploded perspective view of a portion of the coupling of FIG. 1 on an enlarged scale relative thereto.

To illustrate the versatility of this invention, in FIGS. 1 and 2, an end of a length of annularly or circumferentially corrugated sheet metal pipe 1 is shown coupled in axial alignment with an adjacent end of a length of helically corrugated pipe 2 by a coupling, generally designated 3, which defines a preferred embodiment of the present invention. Coupling 3 comprises an elongated one piece bendable strap, preferably of sheet metal but which may be formed of some other suitably strong material. When operatively positioned, coupling 3 surrounds and contacts the exterior of the adjacent ends of pipe lengths 1 and 2 and straddles or bridges the joint interface 4 joined by such ends.

Figure 5:
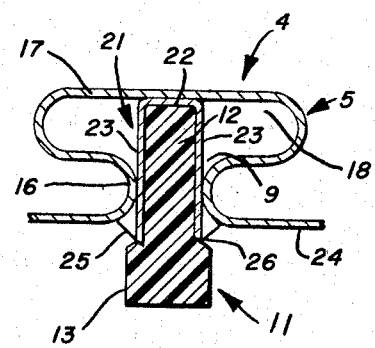
FIG. 5 is a sectional view of a portion of the coupling taken along line 5—5 of FIG. 2 on an enlarged scale relative thereto.

To accommodate means for sealing the coupled pipe lengths against leakage, a pair of circumferentially extending radially outwardly projecting hollow ribs 5 and 6 are formed between the lateral edges 7 and 8 of the coupling strap. The ribs are laterally spaced from each other so that each rib encircles a different one of the adjacent ends of pipe lengths 1 and 2. Each rib defines a radially inwardly opening channel chaped recess, designated 9 and 10, respectively, within which is received the aforementioned sealing means. In the illustrated embodiment, such sealing means comprises a deformable elongated sealing strip 11 having an outer portion 12 received generally within the rib recess and an inner portion 13 which projects radially from such recess (FIG. 5). The projecting portion of each sealing strip extends from the base of the strap a distance sufficient to insure that the strip will reach the bottom of the valleys defined by the corrugations encountered on the pipe lengths being coupled thereto to insure effective sealing.

As will be described hereinafter, means are provided with the coupling for urging opposite ends 14 and 15 of the strap into overlapping relation relative to each other so that the strap completely encircles the respective ends of the pipe lengths being coupled.

Each lateral half of the strap overlies and surrounds one of the adjacent pipe length ends and the strap is of sufficient width in the direction of the pipe axes to insure desired axial alignment of the coupled pipe lengths. The circumferential length of the strap is dependent upon the maximum circumferential dimension of the pipe lengths being coupled and preferably is made slightly greater than such dimension to permit the desired overlap of the opposite ends 14, 15 of the strap.

The lateral edges 7 and 8 of the strap preferably are defined by circumferential radially inwardly directed flanges which diverge relative to each other, as seen in FIG. 2. These flanges engage the surface of the adjacent ends of the pipe lengths in a gripping fashion and thereby impede axial separation of said ends. The extent of engagement between the flanges and the pipe lengths is determined by the form of corrugations on the respective pipe lengths being coupled and by the placement of the flanges relative to the peaks and valleys of such corrugations. As seen from FIG. 1 for example, flange 7 has generally continuous peripheral contact with the circumferential corrugations of pipe length 1 while flange 8 has discontinuous contact with the helical corrugations of pipe length 2.

One of the pair of recess defining ribs 5 and 6 is formed on each lateral half of the strap so that a sealing strip 11 is positioned on each side of the joint interface 4 between the coupled pipe length ends. In the illustrated embodiment, each rib 5 and 6 is generally T-shaped in cross section and is defined by an inner restricted neck portion 16 and an outer enlarged head portion 17, FIG. 5. The enlarged head portion thereby provides each recess 9, 10 with an enlarged recess portion 18 for a purpose to be described.

Figure 4:
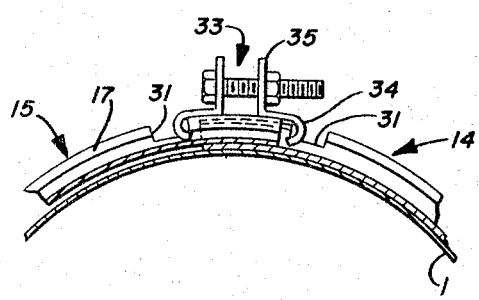
FIG. 4 is a sectional view, on an enlarged scale relative to FIG. 1, taken along line 4—4 thereof.

Ribs 5 and 6 are formed so that when ends 14, 15 of the strap are in overlapping relation, end portions of the ribs at strap end 14 are receivable in telescopic fashion within the recesses defined by the end portions of the ribs at strap end 15, as seen in FIG. 4. That is, ribs 5 and 6 are reduced in dimension at end 14 of the strap, as by swedging, for a distance slightly greater than the anticipated amount of overlap between the ends 14 and 15 of the strap so that the ribs may be slidably interfitted with each other as shown.

The strap preferably also includes a circumferential radially outwardly projecting rib or bead 19 which is located generally centrally between the lateral edges 7 and 8 of the strap. The strap is positioned so that bead 19 is centered around the joint interface 4 between the adjacent ends of pipe lengths 1 and 2. Thus the circumferential recess 20 defined by the bead is located to accommodate any rough edges or burrs and the like which may be encountered at the ends of two pipe lengths being coupled. The bead 19 also is of sufficient size to accommodate some axial movement between the ends of the pipe as may be encountered during expansion or contraction thereof during use.

As noted previously, the coupling includes means to preclude relative rotative movement between the coupled pipe lengths. Such means is received within rib recesses 9 and 10 and, in the illustrated embodiment, is defined by pluralities of channel shaped clip members 21 spaced regularly within the recesses about the inner periphery of the curved strap. Each clip has a base 22 abutting against the inner surface of its associated recess, as best seen in FIG. 5. Each clip 21 has generally parallel flanges 23 projecting radially inwardly through its associated recess to a location spaced radially inwardly of the base 24 of the strap, as also seen in FIG. 5. The flanges 23 contact the narrow neck portions 16 of recesses 9 and 10 and are retained thereby in the recesses. Lateral separation of flanges 23 is prevented by said engagement with the recess neck portions and also by a series of spaced generally triangular projections 25 (FIG. 5) formed on said flanges which engage the recess wall at points lying substantially within the plane of the base 24 of the strap.

Figure 3:
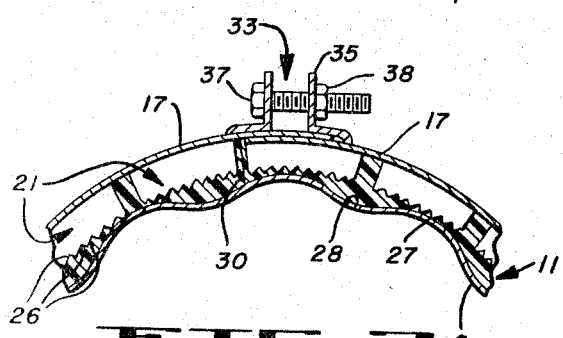
FIG. 3 is a sectional view, on an enlarged scale relative to FIG. 1, taken along line 3—3 thereof.

The projections 25 define a series of rotation preventing teeth 26 for biting engagement with the outer peripheral surfaces of the coupled pipe lengths along the peaks or valleys of the corrugations thereon, depending upon the positioning of the coupling 3 and the type of corrugations encountered. FIG. 3 shows such biting engagement with the helically corrugated pipe length 2. The coupled pipe lengths are thereby held against relative rotative movement and also axial separation by such clips and the biting teeth 26 formed thereon.

The deformable sealing strips 11 are received between the flanges 23 of the spaced clips positioned in each recess 9 and 10, as best seen in FIGS. 2 and 5. At those locations within the recesses 9 and 10 at which clips 21 are located, sealing strips 11 are embraced by the clips. Between adjacent clips, the sealing strips are free to expand laterally into the enlarged portion 18 of the respective recesses defined by the heads 17 of the ribs 5 and 6 (FIGS. 3 and 5).

Strips 11 may be of natural rubber, Neoprene, or like material, and each each has an elongated cross section which defines the aforementioned outer portion 12 which is received within the clips and the aforementioned inner portion 13 which is larger than outer portion 12 and projects from the clips for sealing engagement with the corrugated surfaces of pipe lengths 1, 2.

By way of illustration, FIG. 3 shows clips 21 and a sealing strip 11 engaged in sealing and rotation preventing engagement with a helically corrugated length of pipe 2. Teeth 26 formed at the radially inner edges of clip flanges 23 thus bite into the outer periphery of pipe length 2 generally at the peaks 27 of the corrugations and to varying degrees therewith depending upon the location of a particular clip relative to a given corrugation. The sealing strip 11 extends into the valleys 28 between the corrugation peaks and fill the valleys in leak proof fashion as also seen in FIG. 3.

At the intervals between clips 21, sealing strip outer portions 12 are permitted to freely deform into enlarged recess portions 18 while strip inner portions 13 are deformably sealed against the corrugated surfaces of the coupled pipe lengths. At the clips, strip inner portion 13 projects radially inwardly of clip flanges 23 and is in sealing engagement with the pipe lengths, the strips being deformed to varying degrees depending upon the external peripheral contour of the pipe engaged thereby.

A variation of the present invention may utilize a one piece continuous circumferential clip instead of the plurality of regularly spaced clips 21 as illustrated. In the case of utilization of either the continuous or spaced clip members, it is possible to form such members as an integral element with their associated sealing strip 11. As another alternative, a single knife edge or other biting edge may be provided along each inner edge of the flanges 23 of the clips in place of the serrated edges defined by teeth 26.

With straps ends 14, 15 overlapping, the opposite ends of the respective sealing strips 11 are brought generally into endwise abutting relation as seen in FIG. 3. At the resulting interface 30, each strip 11 undergoes sufficient circumferential deformation, as a result of radially directed forces exerted by the encircling strap, to produce and maintain a continuous circumferential seal around the associated pipe length engaged thereby.

Coupling 3 includes means for drawing ends 14, 15 of the strap towards each other into overlapping sealing relationship when the strap is positioned to encircle adjacent ends of pipe lengths 1, 2, and for securing the overlapped ends against separation. To this end, ribs 5, 6 are cut away adjacent but spaced from ends 14, 15 of the strap to form pairs of transversely opposed notches 31 which are separated from each other by a central web 32. Clamp assemblies 33 having pairs of curved finger members 34 are disposed on the outer surface of ribs 5, 6 so that finger members 34 extend through the respective notches 31 at either side of a web 32 defined thereby and grip the underside of head portion 17 of the ribs at the edge of notches 31 nearest the respective strap ends (FIG. 4). When clamp assemblies 33 are thus positioned, the finger members are disposed in circumferentially opposed pairs with one member of a pair engaged with one end 14 and 15 of the strap of coupling 3. Thus, radial securing pressure may be applied to the strap generally in line with each sealing strip for insuring effective sealing.

Each clamp finger member 34 includes an upstanding portion 35, with the upstanding portions of a pair of finger members 34 being in substantially opposed relation when a clamp assembly is operatively engaged with the strap ribs 5 and 6. Each upstanding portion 35 is provided with a central aperature 36 for receiving a threaded bolt 37 which carries a nut 38 on its end. When a nut 38 is tightened on its associated bolt, the finger members 34 of a clamp assembly will be drawn toward each other and will thereby draw ends 14, 15 of the strap together to increase the overlap thereof. The strap is thereby secured and maintained firmly about the ends of pipe lengths 1, 2 in leak proof straddling relation to the joint interface between the ends of the coupled pipe lengths. Increasing the amount of overlap of strap ends 14, 15 causes the strap to exert increased radial forces on the sealing strips 11 to insure effective sealing at all points along the outer peripheries of the pipe lengths, irrespective of the type of corrgulations carried thereon.

Means other than clamp assemblies 33 may be employed to secure ends 14, 15 against separation. As one alternative, ends 14, 15 may be drawn into overlapping, sealing relation with the ends of ribs 5, 6 at strap end 14 telescopically received in the recesses defined by the ribs of strap end 15 by means of a gripping and pulling tool. While the ends are in such overlapping and interfitting relation the outer ribs 5, 6 thereof may be deformed or crimped onto the inner ribs, so that when the gripping tool is removed ends 14, 15 are secured against separation.

As may readily be seen, the present coupling is very simply applied by merely curving the strap about the ends of the axially adjacent lengths of pipe 1, 2 after the desired axial alignment of said pipe lengths has been obtained. Proper axial positioning of the strap is accomplished by centering bead 19 over the joint interface 4 between the pipe lengths. The reduced ends of the ribs 5 and 6 at end 14 of the strip then are inserted in telescopic fashion into the recesses 9 and 10 defined by the larger ends of ribs 5 and 6 at end 15 of the strap so that the strap is formed into a circumferentially continuous band having overlapping ends. Pairs of clamp assemblies 33 are then engaged in notches 31 on the ribs 5 and 6 and the nut and bolt devices 37, 38 are employed to draw the strap ends together to contract the strap firmly about the pipe lengths whereby the pipe lengths are securely coupled and the joint therebetween sealed.

It should be understood that while the subject coupling has been illustrated herein as connecting together two dissimilarly corrugated pipe lengths, such coupling is obviously also well suited for connecting similarly corrugated pipe lengths, and also generally smooth non-corrugated pipe lengths. Furthermore, when the coupling is engaged with a non-corrugated pipe length or a pipe length having circumferential or annular corrugations thereon, its sealing strip will conform closely to the circumferentially regular outer periphery of such pipe length just as it does when the coupling is engaged with the undulating circumferential periphery of a helicaly corrugated pipe length.

It should also be understood that the claims appended hereto are intended to cover all changes and modifications of the preferred embodiment of the invention herein illustrated and described which do not constitute departures from the spirit and scope of this invention.

I claim:

1. A pipe coupling for joining lengths of corrugated sheet metal pipe, comprising:
   (a) an elongated sheet metal strap curved into a band with its opposite ends in overlapping relation adapted to encircle adjacent ends of a pair of corrugated pipe lengths to be coupled;
   (b) a pair of laterally spaced circumferentially extending radially outwardly projecting ribs formed between lateral edges of said strap and defining radially inwardly opening recesses;
   (c) said lateral edges of said strap being engageable with outer peripheral surfaces of said pipe lengths to be coupled;
   (d) a deformable elongated sealing strip received in each of said recesses with its ends in substantially abutting relation;
   (f) each said sealing strip having a portion projecting radially inwardly from said strap at least a distance equal to the depth of the corrugations in the outer peripheral surfaces of the pipe lengths to be coupled for sealing such strips against such surfaces;
   (g) means securing said ends of said strap in said overlapped relation;
   (h) at least one rotation preventing clip member received in each said rib recess and having a pair of spaced flanges projecting radially inwardly of said strap;
   (i) each of said flanges having an inner edge formed for biting engagement with said surfaces of said pipe lengths to be coupled to preclude relative rotation therebetweeen.

2. The device of claim 1, wherein:
   (j) said coupling includes a series of said rotation preventing clips received in spaced relationship in each of said recesses;
   (k) each of said sealing strips being received between the flanges of each said clip;
   (l) each said clip having a series of biting teeth formed along the edge of each of its flanges.

3. The device of claim 1, wherein:
   (j) said ribs are interengaged in telescopic fashion with each other at said overlapped ends of said strap;
   (k) said ends of each of said sealing strips being abutted with each other within said telescopically interengaged ribs.

4. The device of claim 1, wherein:
   (j) each said rib has notches formed therein adjacent said opposite ends of said strap;
   (k) said means securing said overlapped ends of said strap together comprising clamp assemblies engageable in said notches for drawing said overlapped strap ends together.

References Cited by the Examiner

UNITED STATES PATENTS

| 785,350 | 3/1905 | Custer | 285—373 |
| 1,227,187 | 5/1917 | Olcott | 285—407 |
| 2,107,588 | 2/1938 | Smith | 138—99 X |
| 2,913,262 | 11/1959 | De Cenzo et al. | 285—373 X |
| 3,116,078 | 12/1963 | Scherer | 285—373 X |
| 3,199,901 | 8/1965 | Jeppsson | 138—159 X |
| 3,239,254 | 3/1966 | Campbell | 285—419 X |

CARL W. TOMLIN, *Primary Examiner.*

THOMAS F. CALLAGHAN, *Examiner.*